Oct. 5, 1926.
A. G. M. MICHELL
1,602,117
THRUST BEARING AND LIKE MACHINE ELEMENT
Filed Nov. 12, 1921
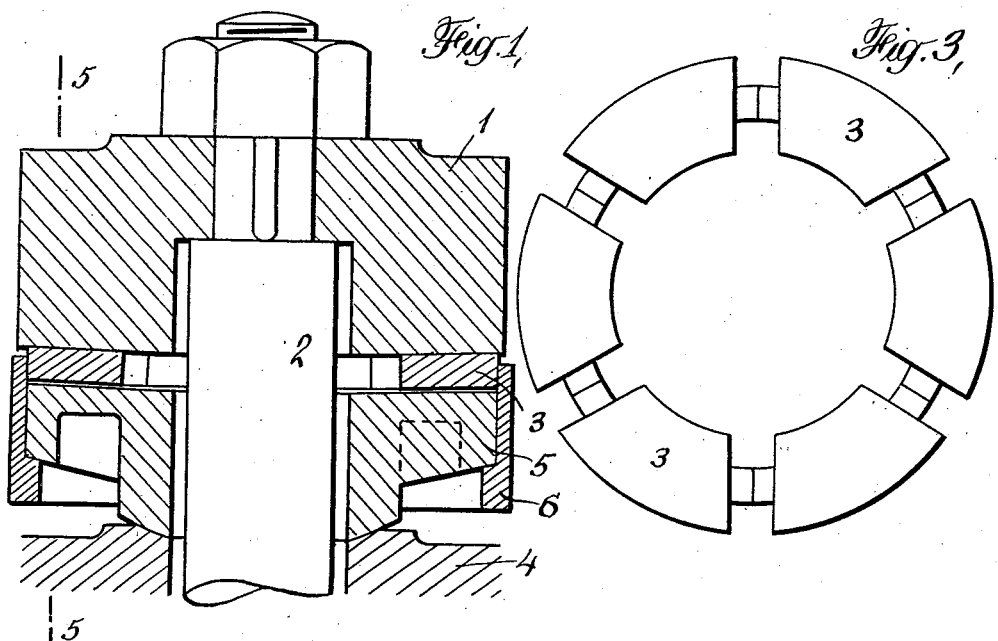
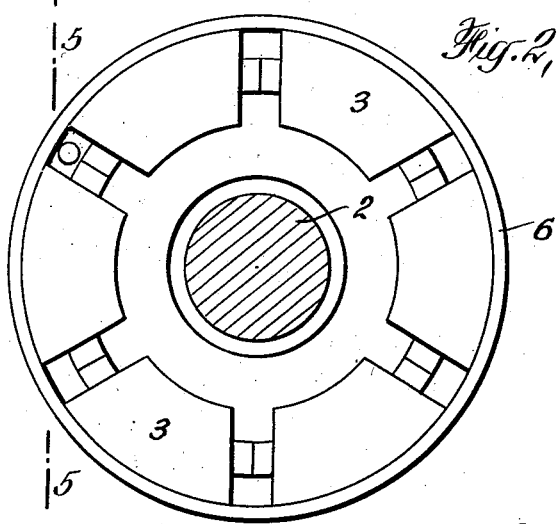
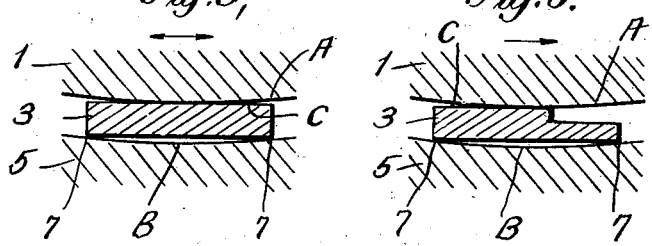
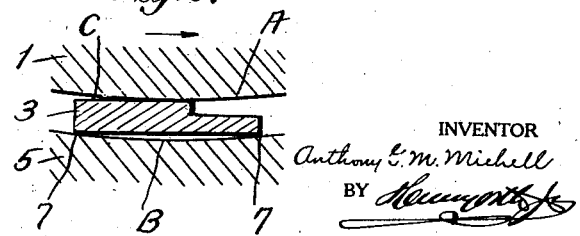
INVENTOR
Anthony G. M. Michell
BY
ATTORNEY Patented Oct. 5, 1926.

1,602,117

UNITED STATES PATENT OFFICE.

ANTHONY GEORGE MALDON MICHELL, OF MELBOURNE, VICTORIA, AUSTRALIA.

THRUST-BEARING AND LIKE MACHINE ELEMENT.

Application filed November 12, 1921, Serial No. 514,702, and in Australia December 15, 1920.

This invention has for its object to secure what is known as pressure-film lubrication, between the coacting members of bearings and other machine elements, in which one of the members has a rotary motion about an axis, while its motion in the direction of that axis is restrained by the other member. According to existing practice, the coacting surfaces of such bearings are made of like geometrical form, thus the collar and shoe of a thrust bearing have both plane surfaces.

In order to permit the formation of a pressure-film of lubricant of varying thickness between such geometrically like coacting surfaces, one of the elements of the pair has in some cases been pivotally or flexibly supported. The present invention secures the formation of such films without it being essential to arrange a pivoted or flexible support for either member.

Briefly stated the main characteristic of the present invention consists in providing a pair of bearing elements between which a pressure is exerted approximately parallel to the axis of rotation and one of which is continuous throughout the extent of the relative motion while the other may be divided into segments. The working surface of the thrust collar is formed not as a plane, as hitherto, but as a slightly convex conical surface. By such construction of coacting members with coacting surfaces of slightly different curvatures, or the combination of a plane coacting surface on one member with a slightly convex coacting surface on the other member the relative location and coaction of such surfaces as required to establish film-lubrication, is secured.

A further and subsidiary characteristic of the invention consists of a non-rotating member of the bearing or like element so supported that the coacting surfaces relative to the coacting rotating member are definitely retained in correct relationship for the operation between the same of film lubrication.

The illustrative embodiment of the invention which is shown and described comprises a thrust collar fixed to a rotary shaft, the working face of the collar being slightly convexed, the opposed coacting fixed surface being a plane, and said opposed surface being provided by a circumferential series of plane faced shoes supported from the fixed frame or casing of the machine.

The accompanying drawings illustrate an application of the invention to a thrust bearing and to a screw. Fig. 1 is an axial section of the thrust bearing and collar. Fig. 2 is a plan view of the parts of the bearing below the collar. Figs. 3 and 4 are views of the element which coacts with the collar. Figs. 5 and 6 are exaggerated diagrammatical sections on the surfaces indicated by the dotted lines 5—5 in Figs. 1, 2.

As shown in Fig. 1 the thrust bearing collar 1 is secured to the rotating shaft 2, and is supported by the stationary shoes 3, which form a circumferential series being in turn supported from the frame or casing 4, by the spherical-seated pillow 5, and retained radially by the keep ring 6.

The collar 1 embodies the main characteristics of the invention in that its lower or working surface is slightly convex or coned. The upper surface of the pillow 5, is formed with a corresponding slight concavity. The shoes 3, have each plane and parallel upper and lower surfaces, but these shoes being supported by their lower radial edges on the concave surface of the pillow 5, their upper working surfaces will each be slightly inclined at the same angle as the generating lines of the cone-surface of the collar 1.

The operative relation of the shoes 3 of the thrust bearing to the coacting surface of the thrust bearing collar is shown in Figs. 5 and 6, in which the curvatures and clearances of the parts are exaggerated for the sake of clearness. In Fig. 5, A is the lower convex coned surface of the collar 1, while B is the upper surface of the pillow 5. The elements 3, as shown, may be taken to represent the shoes of the thrust bearing, their upper plane or slightly curved surfaces C forming with the surface A, interspace of varying thickness which in action would be filled with lubricant in which pressures would be automatically generated by the relative motion of the surfaces A and C. As shown in Figs. 5 and 6, the lower surfaces of the elements 3 are shown as resting with their radial edges 7 upon the supporting surface B, thus agreeing with the construction of the shoes 3 of the thrust bearing shown in Figs. 1–4.

In Fig. 5, the elements B being symmetrical, the action described would take place similarly with motion of the surface A in either direction as indicated by the double headed arrow. If motion is required in one direction only the same action may be secured with less resistance from fluid friction by dispensing with portions of the surfaces C at their leaving ends as indicated in Fig. 6, which in all other respects is similar to Fig. 5.

It will be understood that the invention is not restricted to the particular methods of supporting the shoes or blocks which have been described above, as any mode of support may be used, which may be effective in bringing the shoes or blocks into correct adjustment relatively to the collar according to the principles hereinbefore set out.

I claim:—

1. A thrust bearing comprising a thrust collar having a slightly conical bearing surface generated by a line nearly approximating a right angle to the axis of rotation and a plurality of bearing shoes surrounding the axis of rotation and equally spaced therefrom, said bearing shoes having surfaces tangent to said bearing surface.

2. A thrust bearing comprising a thrust collar having a uniformly curved bearing surface and a plurality of bearing shoes surrounding the axis of rotation and equally spaced therefrom, means for supporting said bearing shoes to present their contacting surfaces in such relation to said curved surface as to form a line contact therewith and interspaces gradually widening from said line contact in the direction of relative movement.

3. A thrust bearing comprising a thrust collar having a uniformly curved bearing surface and a plurality of bearing shoes having comparatively flat faces surrounding the axis of rotation and equally spaced therefrom, movable means for supporting said shoes to present their contacting surfaces in such relation to said curved surface as to form a line contact therewith and interspaces gradually widening from said line contact in the direction of relative movement.

4. A thrust bearing comprising a thrust collar having a convex, conical bearing surface, a supporting member having a concave surface and an annular series of bearing shoes having comparatively flat faces between said surfaces.

5. A thrust bearing comprising a thrust collar having a convex, conical bearing surface, a supporting member having a concave surface and an annular series of bearing shoes having comparatively flat faces between said surfaces, and means for movably supporting said member.

6. A thrust bearing comprising a thrust collar having a convex, conical working surface, a supporting member having a concave, conical working surface, and a plurality of bearing shoes between the surfaces, said shoes tangent to the working surface of the collar at places that are not opposite to those where the shoes contact with the supporting member.

7. A thrust bearing comprising a thrust member having a curved working surface, a supporting member also having a curved working surface, and shoes between the surfaces, said shoes co-operating at their ends with one of said surfaces and co-operating between their ends with the other surface.

8. A thrust bearing comprising a thrust collar having a convex, conical bearing surface, a supporting member having a concave supporting surface, and an annular series of shoes having comparatively flat faces, each of said shoes having a substantially line contact intermediate its ends with said curved bearing surface and substantially line contacts at its ends with said supporting surface.

9. A thrust bearing comprising a thrust collar having a convex, conical bearing surface, a supporting member having a concave supporting surface, and an annular series of shoes having comparatively flat faces, each of said shoes having a substantially line contact intermediate its ends with said curved bearing surface and substantially line contacts at its ends with said supporting surface, and means on the shoes to maintain them spaced from one another.

10. A thrust bearing comprising a pair of members having surfaces of opposite but similar curvature generated by lines closely approximating a right angle to the axis of rotation and an annular series of shoes having comparatively flat faces, interposed between said members.

11. A thrust bearing comprising a pair of members having surfaces of opposite but similar curvature generated by lines closely approximating a right angle to the axis of rotation and an annular series of shoes having comparatively flat faces, interposed between said members, each shoe being cut away at its leaving end to dispense with fluid friction at such end.

12. A thrust bearing comprising a collar having a curved working surface, a supporting member, a series of shoes between said collar and member, each tangent to said surface and each being cut away at its leaving end to dispense with fluid friction at such end.

13. A thrust bearing comprising a collar having a convex conical surface, a supporting member having a concave surface, and an annular series of supporting shoes between the surfaces, the upper face of said shoes being tangent to said conical surface between their ends and the ends contacting with said concave surface.

14. A thrust bearing comprising a collar having a convex conical surface, a supporting member having a concave surface, an annular series of supporting shoes between the surfaces, the upper face of said shoes being tangent to said conical surface between their ends and the ends contacting with said concave surface, and each shoe being cut away at its leaving end to dispense with fluid friction at such end.

Dated this seventh day of October, 1921.

ANTHONY GEORGE MALDON MICHELL.